United States Patent

Moritz

[11] Patent Number: 5,088,230
[45] Date of Patent: Feb. 18, 1992

[54] CRAB TRAP

[76] Inventor: Andrew J. Moritz, 3200 W. Commodore Way, (Condo 3-10), Seattle, Wash. 98199

[21] Appl. No.: 553,174

[22] Filed: Jul. 10, 1990

[51] Int. Cl.⁵ .................... A01K 69/08; A01K 69/04
[52] U.S. Cl. ......................................... 43/100; 43/102
[58] Field of Search .............. 43/100, 102, 103, 104, 43/105

[56] References Cited

U.S. PATENT DOCUMENTS

| | | | |
|---|---|---|---|
| 2,119,828 | 6/1938 | Nordenstam | 43/100 |
| 2,530,449 | 11/1950 | Bush | 43/102 |
| 3,184,881 | 5/1965 | Jatzeck | 43/102 |
| 3,209,484 | 10/1965 | Beamer | 43/100 |
| 3,300,890 | 1/1967 | Thomassen | 43/100 |
| 3,373,523 | 3/1968 | Olafson | 43/100 |
| 3,678,612 | 7/1972 | Hendrickson | 43/66 |
| 3,821,861 | 7/1974 | Jalbert | 43/65 |
| 3,906,655 | 9/1975 | Lowenthal | 43/100 |
| 4,075,779 | 2/1978 | Olafson | 43/100 |
| 4,184,283 | 1/1980 | Wyman | 43/102 |
| 4,538,376 | 9/1985 | Morton | 43/100 |
| 4,706,409 | 11/1987 | Downing | 43/102 |
| 4,819,369 | 4/1989 | Bodker | 43/102 |
| 4,887,382 | 12/1989 | Moritz | 43/102 |
| 4,905,405 | 3/1990 | Hendricks | 43/100 |

*Primary Examiner*—Kurt Rowan
*Attorney, Agent, or Firm*—Glenn D. Bellamy

[57] ABSTRACT

A crab trap having a bottom, top, and side walls substantially encloses a crab-trapping interior. An entryway is provided in a side wall and includes an upwardly and inwardly sloped ramp terminating at an inner edge which is spaced between the top and bottom walls. The side wall has a portion terminating at the lower edge which is spaced outwardly from and below said ramp's inner edge at the entryway such that crabs entering the trap will not be obstructed or deterred in any way but crabs seeking to exit the trap will be provided with an alternative platform within the trap, rather than exiting down the entryway ramp.

5 Claims, 4 Drawing Sheets

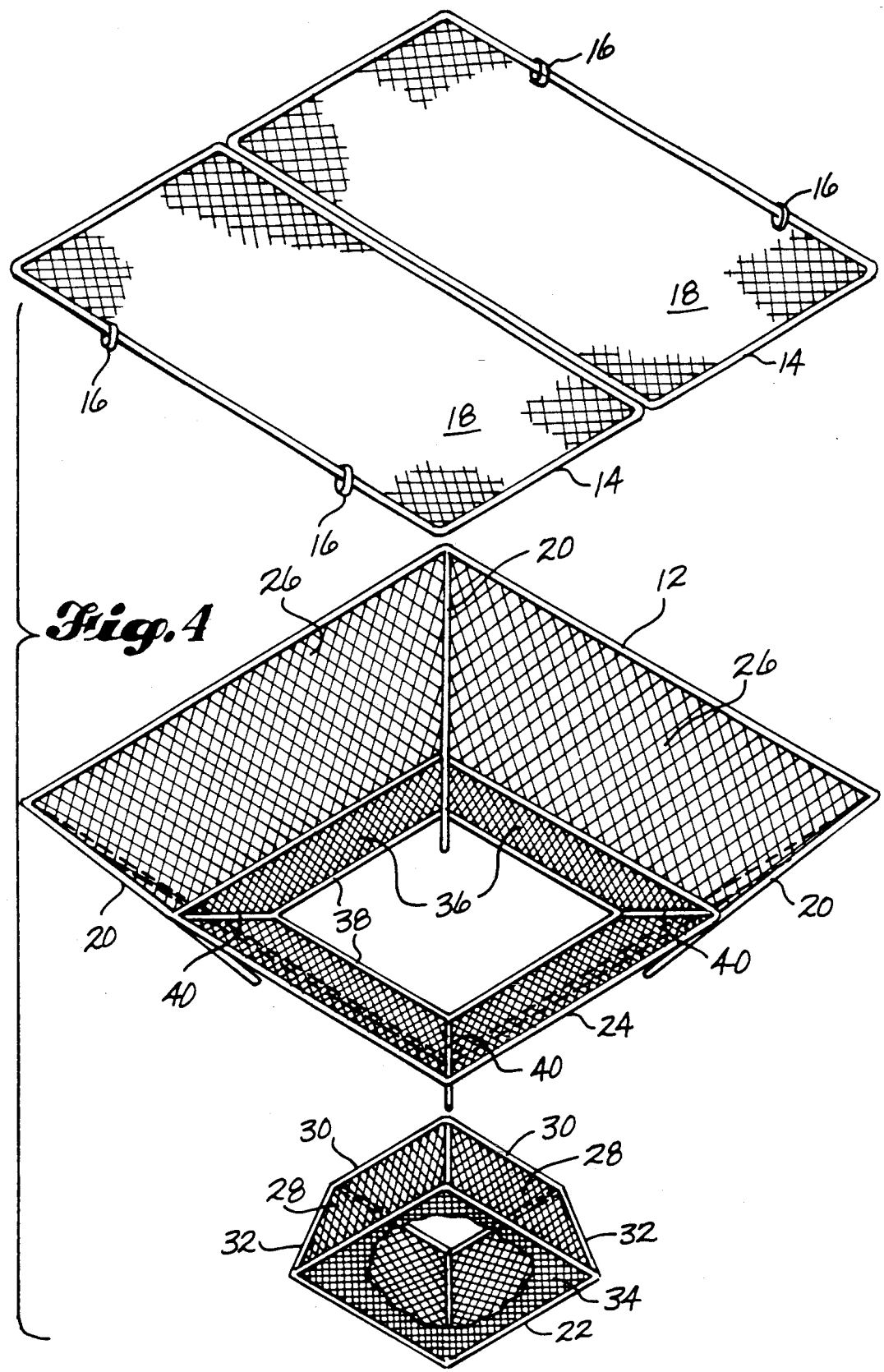

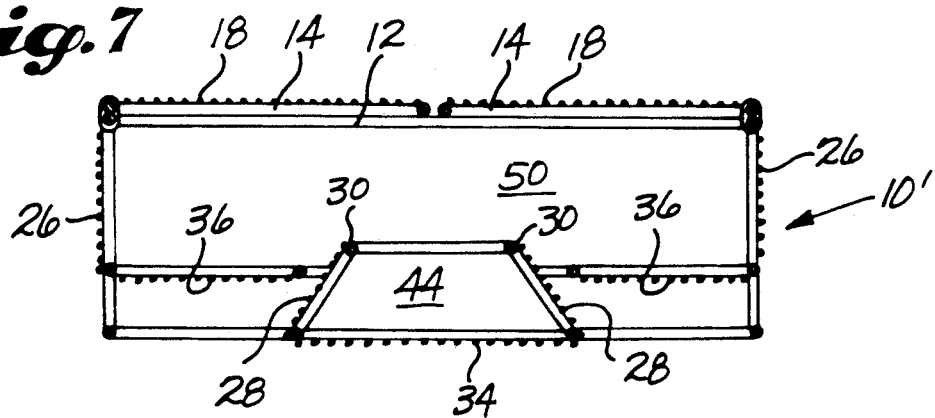
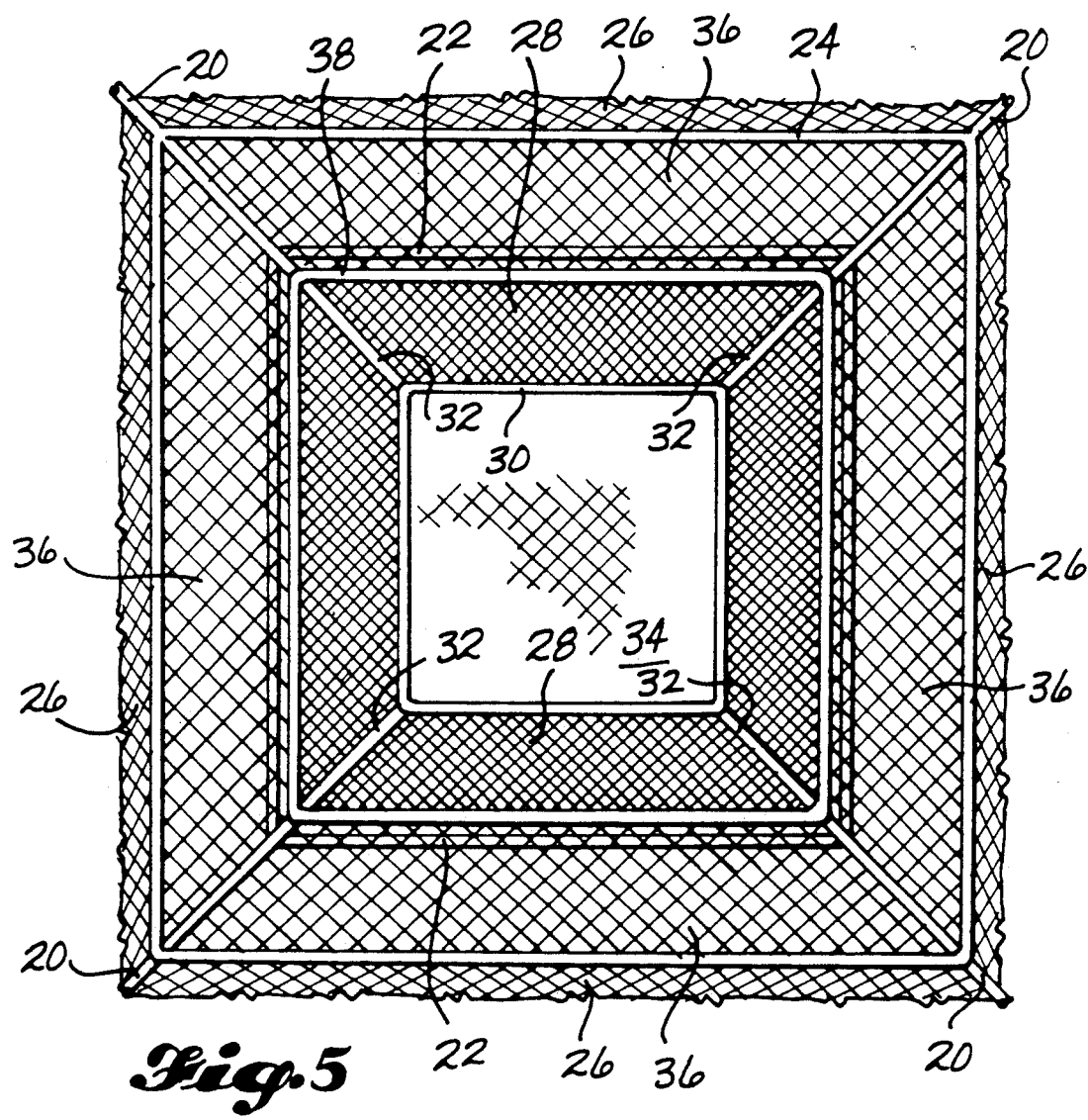

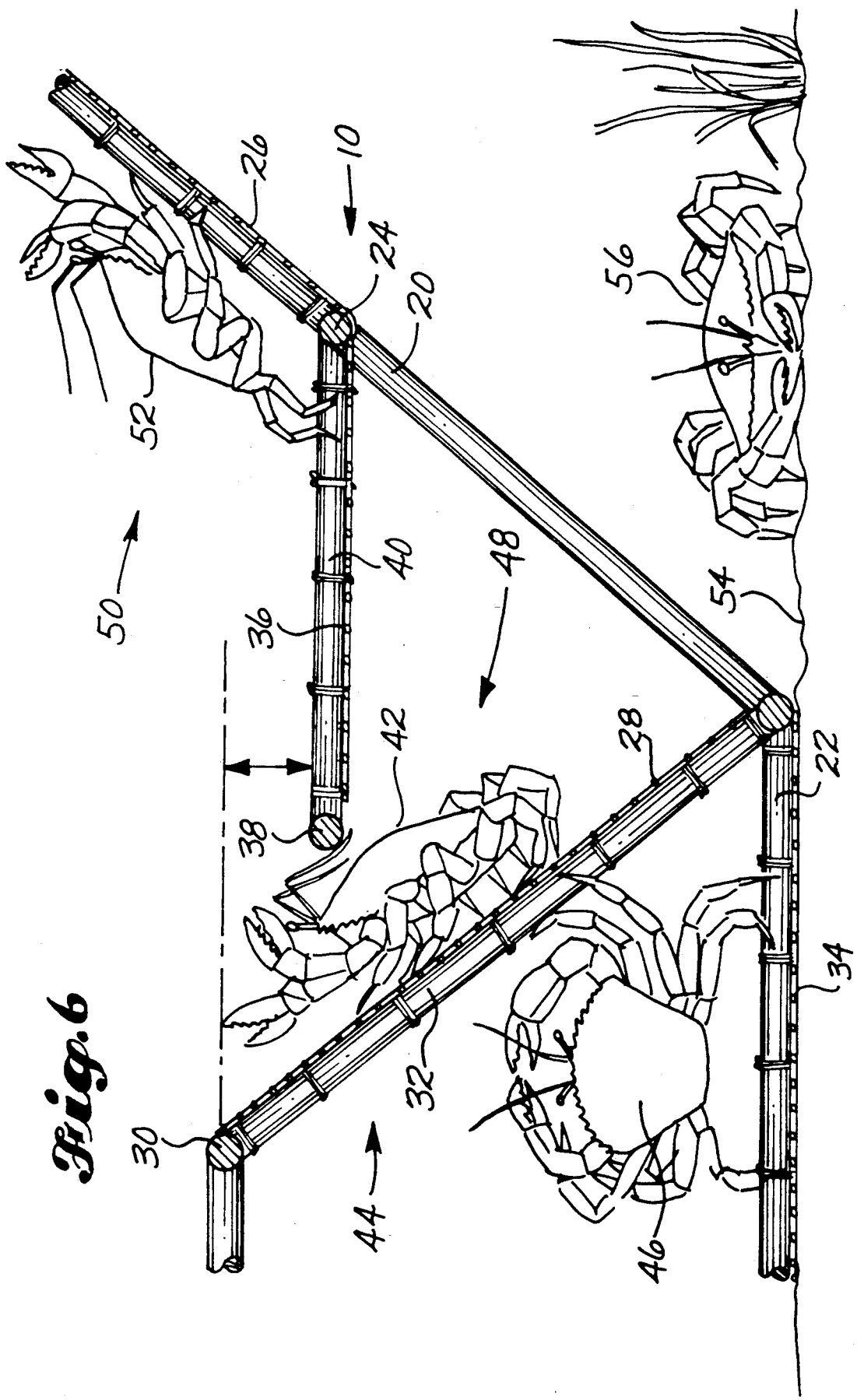

CRAB TRAP

TECHNICAL FIELD

This invention relates to crab traps and, more particularly, to a type of trap having an improved anti-escape entry gate which increases the capacity of the trap and operates effectively without moving parts.

BACKGROUND ART

A well-known objective in the design and construction of crab traps, whether for king, snow, dungeness or other crab, is to provide an entryway into an enclosure which does not pose significant barriers or deterrents to the crab's entrance, but which also provides a significant barrier or deterrent to escape. Typically, this problem is addressed in one of two ways. The first is to provide an upwardly-sloped entry tunnel through which crabs will crawl seeking bait located inside the trap. Escape from the trap is prevented by spacing the interior end of the entry tunnel some distance above the bottom of the trap so that entering crabs spill over into the trap enclosure, unable to climb out. Examples of crab traps using this type of entry are shown in U.S. Pat. Nos. 3,184,881; 3,209,484; 3,300,890; 3,373,523; and 4,075,779. The second is to provide a swinging or deflectable gate at the opening which acts as a one-way door. Examples of this type of trap are shown in U.S. Pat. Nos. 2,530,449; 3,678,612; 4,184,283; and 4,887,382. Some of these traps incorporate a combination of these devices.

A problem associated with the first approach is that once a quantity of crabs accumulates in the bottom portion of the trap, those which enter later are capable of reaching the inner edge of the entryway and escape outwardly therethrough. A problem associated with the second approach is that some crabs are deterred from entering by even slight physical interference or by the electrolytic charge which may build up between submersed moving metal parts.

SUMMARY OF THE INVENTION

The present invention provides a crab trap having bottom, top, and side walls which substantially enclose a crab-trapping interior. An entryway is formed in a side wall which includes an upwardly- and inwardly-sloped ramp terminating at an inner edge which is spaced between the top and bottom walls. The side wall has a portion terminating at a lower edge which is spaced outwardly from and below the ramp's inner edge.

A crab trap according to the present invention provides an unrestricted entryway without barriers which need to be deflected or which deter a crab's entrance in any way. The captured crabs are deterred from exiting in part by their spillover into a lower compartment below the inner edge of the entry ramp. Those crabs which are able to climb out of that lower compartment are deterred from exiting by the positioning of the side wall's lower edge, especially by its positioning adjacent to but slightly below the entry ramp's inner edge. Although the behavior of crabs will vary somewhat in different geographic regions, the natural instinct of many crabs is to climb in an upward direction whenever this alternative is presented to them. The positioning of the side wall's lower edge provides such an alternative to a crab attempting to escape down the entryway ramp. In this manner, captured crabs will tend to climb and accumulate in upper regions of the trap. Because this entryway structure has not been present in prior art crab traps, the overall design of the prior art traps was usually to minimize the upper region volume of the trap and to maximize the lower region below the spillover edge. Examples of this overall design are especially shown in U.S. Pat. Nos. 3,209,484; 3,300,890; 3,678,612; and 4,184,283. The present invention, however, makes use of both the lower region and a large upper region for collection of crabs within the trapping interior space.

According to an alternative embodiment, the trap may include a substantially-horizontal ledge portion at the lower edge of the side wall. Such a ledge presents the crab with an uninhibited travel route and allows the upper compartment of the trap to be made larger.

Other aspects and features of the present invention will become apparent upon careful consideration of the drawings, claims, and description of the best mode for carrying out the invention which follows, all of which are part of the present disclosure.

BRIEF DESCRIPTION OF THE DRAWINGS

Like reference numerals are used to indicate like parts throughout the various figures of the drawing; and therein:

FIG. 4 is a lower isometric exploded view of the trap with a portion of the bottom panel cut away to show structural detail;

FIG. 5 is a top sectional view taken substantially along line 5—5 of FIG. 3;

FIG. 6 is a detailed sectional view showing an entryway according to the preferred embodiment; and FIG. 7 is a sectional view similar to that of FIG. 3, showing an alternative embodiment of the present invention.

BEST MODE FOR CARRYING OUT THE INVENTION

Figure 1:
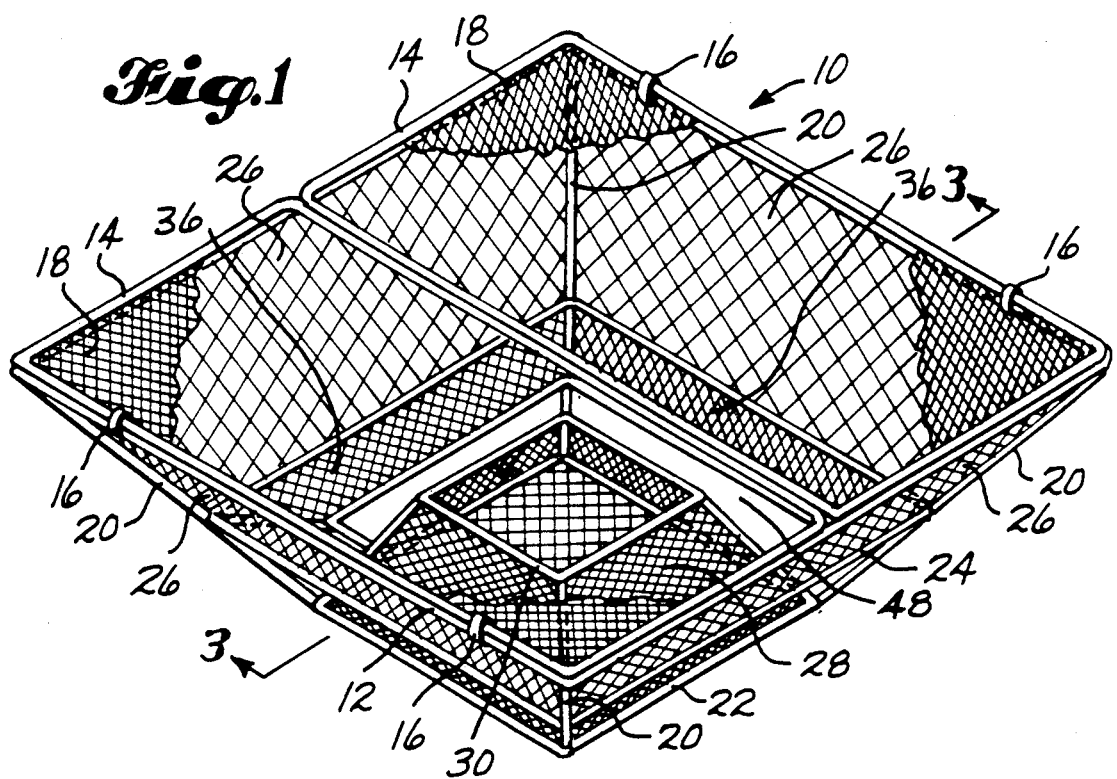
FIG. 1 is an upper isometric, partially cut-away view of a crab trap constructed in accordance with the preferred embodiment of the invention.
Figure 2:
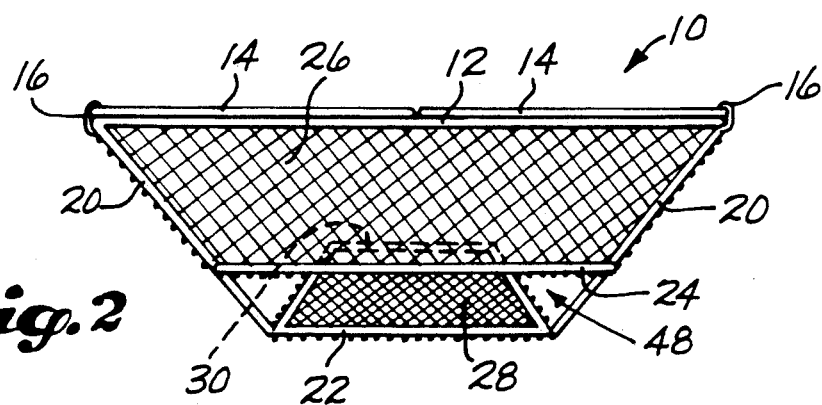
FIG. 2 is a side view of the trap shown in Fig. 1.
Figure 3:
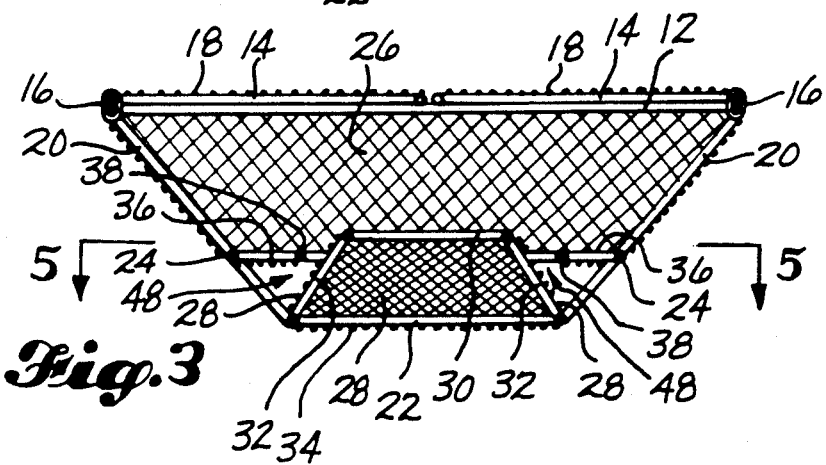
FIG. 3 is a cross-sectional view taken substantially along line 3—3 of Fig. 1.

Referring to all of the various figures of the drawing, and first to FIG. 1, therein is shown at 10 a crab trap according to the preferred embodiment of the present invention. Generally, the trap 10 is of a relatively square shape having sloped side walls which narrow from a larger top to a smaller bottom.

Referring now also to FIGS. 2, 3, 4 and 5, the trap 10 is constructed of rigid frame members onto which is attached a mesh material which forms the top, bottom, and side walls. The frame includes a top hoop 12 which defines the overall shape of the trap 10 and onto which door or access gate frames 14 may be hingingly attached 16 in a well-known manner. Mesh material 18 is attached to the door frames 14 to define an access/closure means which will contain trapped crabs and allow free water circulation through the trap 10. Other closure means may be substituted as is well known in the art, such as by pursing a flexible netting material with a drawstring (not shown).

The frame also includes side members 20 which extend from corners of the top frame portion 12 to corners of a bottom frame portion 22. As will be discussed in detail below, it is preferred that the side frame members 20 be positioned at the corners to allow the most open entrance of crabs into the trap 10. The number of side frame members 20 to be used will depend upon the size and shape of the trap 10. Although a square trap is illustrated, the present invention may also be made round or in another multi-sided shape.

Intermittent between the upper 12 and lower 22 frame portions is an intermediate frame hoop 24. Mesh side walls 26 are attached to and extend between the upper frame portion 12, the intermediate frame portion 24, and the side frame members 20. An entryway is defined below the intermediate frame 24 and bottom frame 22.

Sloping upwardly and inwardly from the perimeter of the bottom frame portion 22 is an entryway ramp 28 which is also formed of a mesh material. The entryway ramp 28 extends to an inner edge 30 which is defined by another rigid frame portion. The frame portion defining the inner edge 30 is supported in position by lower side members 32. A lower interior compartment of the trap 10 is thereby defined by the entryway ramp panels 28 between the inner edge 30 and a bottom panel 34, also of a mesh material, which extends across the lower frame portion 22.

Extending inwardly from the intermediate frame portion 24 is a substantially-horizontal ledge 36, also of a mesh material, which is supported by a ledge frame member 38 and corner supports 40. The ledge 36 is spaced outwardly a distance from the entryway ramp 28 sufficiently to allow crabs to enter the trap 10 without obstruction. The inner edge of the ledge 36, defined by the ledge frame member 38, is positioned downwardly below the inner edge 30 of the entryway ramp. This structural relationship may be seen easily by reference to FIGS. 3, 5 and 6. This structure is an important feature of the present invention.

Referring specifically to FIG. 6, as a crab 42 enters the trap 10 by climbing up the entryway ramp 28, it enters without significant obstruction by the ledge 36 or side wall panel 26. Seeking bait which is positioned centrally in the trap 10, the crab 42 will continue up the entryway ramp 28 until it reaches the inner edge 30. The crab 42 is likely to spill over into and be trapped by the lower interior portion 44 of the trap 10. Once a crab, such as 46, is resting on the bottom panel 34, it is very difficult for the crab 46 to reach the inner edge 30 of the entryway ramp 28 to escape. Eventually, the lower interior compartment 44 of the trap 10 may become sufficiently filled with crabs 42, 46 such that a later-entering crab may be able to reach the inner edge 30 of the entryway ramp 28. Having realized its predicament, it will seek to escape in search of other food.

Although the particular behavior of crabs may vary from one geographic region to another, in many regions crabs will, when given the alternative, seek to climb in an upward direction in search of food or escape. If the trap 10 is constructed with an entryway 48 on fewer than all sides of the trap 10, a trapped crab climbing upwardly to escape may simply climb away from the entryway into an upper region 50 of the trap 10 without achieving actual escape. If the trapped crab seeking to escape the trap 10 climbs toward the entryway ramp 28, as it must if the trap is constructed with an entryway 48 around its entire perimeter as shown, the crab will notice, as with its antennae, the horizontal ledge 36 which is presented as an alternative to climbing downwardly on the entryway ramp 28. The inner edge 38 of the ledge 36, or lower edge of a side wall panel 26, may be positioned as shown so that a crab 52 rather than escaping will opt to climb onto the ledge 36 and up the side wall panel 26 into the upper region 50 of the trap 10. In this manner, the capacity of the trap 10 is not limited to the area below the inner edge 30 of the entryway ramp 26, but may include the entire interior volume of the trap 10.

For proper operation of this feature, it is important that the ledge 36 or side wall 26 have a termination which is positioned below the inner edge 30 of the entryway ramp 28 and outwardly spaced from the entryway ramp 28 sufficiently to allow uninhibited entrance of a crab 42 but sufficiently close to be noticed as an alternative direction of travel by a crab attempting to escape the trap 10.

As described in my previously-issued U.S. Pat. No. 4,887,382, the overall shape of the crab trap 10, having sides which slope inwardly as they extend from the top down to the bottom, produces drag forces acting on the trap, as the trap is moved through the water, that will cause the trap to remain substantially upright during settling of the trap through the water. This feature is completely described in my above-referenced patent, the entire contents of which are incorporated into this disclosure by this specific reference thereto.

An alternate embodiment of the present invention is shown in FIG. 7, which rather than having sloped side walls is shown having substantially vertical side walls with an enlarged or widened ledge portion 28. This embodiment 10' incorporates the entrance structure of the present invention but lacks the particular features provided by the preferred shape, including the tendency to "parachute" or settle in an upright position during placement of the trap and the ability to be compactly nestable when stored on the deck of a boat or on land.

Although the use of a ledge portion 28 on either embodiment 10, 10' allows the volume of the upper region 50 of the trap 10, 10' to be increased, it is not critical to operation of the present invention. Instead, a lower edge of a side wall panel 26 may extend to the above-described position slightly below and outwardly from the inner edge 30 of the entryway ramp 36. This will allow a trapped crab to climb directly onto the sidewall as an upward alternative route.

Many variations of the present invention may be made without departing from its spirit and scope. For example, the top, bottom and side wall panels may be made from metal wire, a woven cord mesh netting, or a molded thermoplastic material, or any other suitable material which is durable and allows the desired water circulation. The frame members may be made of any suitable material with sufficient rigidity and strength, or may be eliminated altogether in the case of a self-supporting wire mesh wall material. It is important that the bottom edge of the entryway ramp 28 be positioned to be sufficiently close to the sea floor 54 when the trap 10 is in a set position such that crabs 42, 56 may enter without significant obstruction. The particular angle of incline of the entryway ramp 28 may be varied according to the manufacturer's preference or according to the preference of crabs in a particular region. An entryway 48 may be provided in one side only, multiple sides, or around the entire bottom perimeter of the trap, as desired. It is important only that, at each location where an entryway 48 or entryway ramp is provided, that a lower termination of a sidewall 26 or ledge 36 be provide in the downwardly and outwardly spaced position from the inner edge 30 of the entryway ramp 28. Endless other variations may be made in the form and appearance of the present invention, as desired. Therefore, the protection granted to me by a patent is not to be limited by the above description and illustration of a preferred embodiment, but rather only by the following claim or claims interpreted according to accepted doctrines of claim interpretation, including the doctrine of equivalents.

What is claimed is:

1. A crab trap, comprising:
   bottom, top, and side walls substantially enclosing a crab-trapping interior;
   an unobstructed entryway in a side wall, said entryway including an upwardly and inwardly sloped ramp terminating at an inner edge which is spaced between said top and bottom walls; and
   said side wall having a portion at said entryway terminating at a lower edge which is spaced outwardly from and below said ramp's inner edge defining a space between said inner edge and said lower edge of sufficient size to allow a crab to enter said trap therebetween without displacement of either of said edges.

2. A crab trap, comprising:
   bottom, top, and side walls substantially enclosing a crab-trapping interior;
   an unobstructed entryway in a side wall, said entryway including an upwardly and inwardly sloped ramp terminating at an inner edge which is spaced between said top and bottom walls; and
   said side wall having a portion at said entryway terminating at a lower edge which is spaced outwardly from and below said ramp's inner edge
   wherein said side wall portion includes a substantially horizontal ledge region at said lower edge.

3. The crab trap of claim 1, wherein said entryway extends substantially entirely around a bottom perimeter of said crab trap.

4. The crab trap of claim 1, wherein said side wall is sloped from said top wall inwardly toward said lower edge.

5. The crab trap of claim 1, wherein said side wall is sloped from said top wall inwardly toward said substantially horizontal ledge region.

* * * * *

UNITED STATES PATENT AND TRADEMARK OFFICE
CERTIFICATE OF CORRECTION

PATENT NO. : 5,088,230
DATED : February 18, 1992
INVENTOR(S) : Andrew J. Moritz It is certified that error appears in the above-identified patent and that said Letters Patent is hereby corrected as shown below:

Column 1, line 31, there is a period after "devices".
Column 2, lines 50 and 57, "!0" should be -- 10 --; and in
    line 59, "!6" should be -- 16 --.
Column 3, lines 5, 22, 45, 49, 58, 59, 61, and 63, "!0"
    should be -- 10 --.
Column 4, lines 4, 5 and 58, "!0" should be -- 10 --.
Claim 5, column 6, line 21, "claim 1" should be -- claim 2 --.

Signed and Sealed this

Fifteenth Day of June, 1993

Attest:

MICHAEL K. KIRK

*Attesting Officer*     *Acting Commissioner of Patents and Trademarks*